United States Patent [19]

Silverwater

[11] 4,205,702
[45] Jun. 3, 1980

[54] FLOW SENSOR RESPONSIVE TO FLUID LEAKAGE FLOW WITHIN A RANGE FROM ABOVE A PREDETERMINED MINIMUM TO BELOW A PREDETERMINED MAXIMUM AND NONRESPONSIVE TO FLUID LEAKAGE FLOWS BEYOND SAID RANGE

[75] Inventor: Bernard F. Silverwater, Plainview, N.Y.

[73] Assignee: Pall Corporation, Glen Cove, N.Y.

[21] Appl. No.: 6,058

[22] Filed: Jan. 24, 1979

[51] Int. Cl.² ............................................. F16K 37/00
[52] U.S. Cl. ................................... 137/557; 137/554; 116/268; 210/90
[58] Field of Search ................. 210/90; 137/554, 557, 137/551; 116/266, 267, 268

[56] References Cited

U.S. PATENT DOCUMENTS

| 2,935,040 | 5/1960 | Steensen | 116/268 |
| 3,077,176 | 2/1963 | Pall et al. | 116/267 |
| 3,094,969 | 6/1963 | Whiting | 116/268 |
| 3,128,743 | 4/1964 | Whiting | 210/90 |
| 3,212,471 | 10/1965 | Willis | 116/267 |
| 3,283,902 | 11/1966 | Farris et al. | 210/90 |
| 3,311,125 | 3/1967 | Beasley | 137/557 |
| 3,335,863 | 8/1967 | Silverwater | 116/268 |
| 3,495,566 | 2/1970 | Pall | 116/267 |
| 3,828,812 | 8/1974 | Read | 210/90 |

FOREIGN PATENT DOCUMENTS 891246 3/1962 United Kingdom ................ 116/267

*Primary Examiner*—Martin P. Schwadron
*Assistant Examiner*—A. Michael Chambers

[57] ABSTRACT

A flow sensor is provided responsive to fluid leakage flows within a range from above a predetermined minimum to below a predetermined maximum, to indicate that leakage flow is within that range and/or that maximum leakage flow has been exceeded, but nonresponsive to fluid flows below the predetermined minimum or above the predetermined maximum, to avoid giving a false indication of fluid leakage flow, comprising a flow responsive valve and a differential pressure indicator sensing differential pressure between fluid leakage flow and normal fluid flow at the valve.

20 Claims, 3 Drawing Figures

FLOW SENSOR RESPONSIVE TO FLUID LEAKAGE FLOW WITHIN A RANGE FROM ABOVE A PREDETERMINED MINIMUM TO BELOW A PREDETERMINED MAXIMUM AND NONRESPONSIVE TO FLUID LEAKAGE FLOWS BEYOND SAID RANGE

Extraordinary demands are made upon the hydraulic systems of aircraft. The hydraulic fluids used must withstand temperature ranging from −65° F. to as high as 275° F., and occasionally even higher, and must be completely flowable and operative in the system under these conditions.

Wear and abrasion of parts result in the production of very fine particles, usually 0.05 to 1 micron in diameter. While these fine particles are so small that individually they cause no obstruction, there is nonetheless a tendency for sedimentation of such particles in regions where the rate of flow is rather low, and for collection of such particles in the small (often 5 microns or less) clearances in pump pistons, servo valves, actuators, valves and other components. In the course of time, serious obstructions can be built up even from such small particles. Indeed, it is the very fine particles that are usually responsible for pump failure in such systems.

It is now quite generally accepted that because of this, maintenance of a clean hydraulic fluid requires efficient filtration. It is a necessary corollary that one must be able to determine that the filter in the system is capable of removing very small particles and has a sufficient flow capacity to meet the flow requirements of the system. In normal flight, a flow of hydraulic fluid of the order of 5 to 12 gallons per minute or less may be sufficient, but whenever the landing gear flaps or other large hydraulically operated gear is operated, a higher flow rate can be required, considerably in excess of 12 gallons per minute under certain conditions. Flow capacity of a filter is of course a function of surface area, and in the limited space requirements of aircraft, it has only recently been possible to provide a filter element sufficiently rugged for hydraulic system service and having a fine enough incident particle removal rating, and a high enough flow capacity, to meet these requirements.

U.S. Pat. Nos. 3,262,563 patented July 26, 1966 to David B. Pall, 3,262,564 patented July 26, 1966, 3,262,565 patented July 26, 1966 and Canadian Pat. No. 742,051 patented Sept. 6, 1966, provide filter assemblies capable of removing a substantial proportion of very find particles, as small as 0.05 micron, as well as nearly all incident particles over 0.45 micron in diameter, and all incident particles over 3 microns in diameter, and capable of supplying a flow rate as high as may be desired upon demand. A filtered flow is provided at all flow rates, but at flow rates in excess of a predetermined maximum, only a portion of the flow is filtered through the primary filter element, of low micron removal rating, capable of removing all particles as small as 3 microns in diameter. The remainder is diverted by a flow control valve through a secondary filter of normal flow capacity and high micron removal rating, capable of removing most of the incident particles as small as particles 1.5 microns or larger in diameter, and all incident particles over 15 microns. The normal flow through the primary element is the maximum required, plus a safe margin, for normal operational flow in the system in which the element is installed. Only when extraordinary requirements are made upon the flow, beyond this maximum, does the flow control valve divert the incremental portion of the flow through the secondary (coarse or high micron removal rating) filter element. Since such extraordinary flow requirements are usually made only for short periods, less than 2 to 3% of the total flight time, the filter assembly of the invention effectively keeps the hydraulic fluid substantially free of particles larger than 0.45 micron in diameter, since any such particles that may enter the fluid during the times of extraordinary flow are removed later in the course of normal flow.

As a further feature, these filter assemblies provide for maintenance of a filtered flow through the secondary or coarse filter element whenever the primary element is clogged or so obstructed that the flowthrough results in a pressure differential across that element above a predetermined minimum. In this event, the flow control valve provided diverts through the secondary filter element flow above that which the partially or fully clogged primary element can pass.

A second by-pass as an optional feature is provided for the secondary filter element, so that when this element becomes clogged, or so obstructed as to increase the pressure differential across it to above a predetermined minimum, then all flow through the filter bypasses both the primary and the secondary filter elements. Normally, there is ample time after the primary element has become obstructed for the filter element to be serviced before the secondary filter element becomes clogged. Thus, the second by-pass line would come into use only in the event of an emergency of rather unusual character.

In certain systems, intolerant of any contaminant above 15 microns, it will be preferable to omit the by-pass valve around the secondary element, in which event the secondary element is preferably fabricated with internal support such that it will withstand full system pressure as a differential pressure across it.

For control of the diversion of fluid from the primary filter element at flow rates above the predetermined maximum, as well as diversion whenever the primary filter element becomes obstructed so that the pressure differential across it reaches a predetermined minimum, there is provided a flow valve of the orifice or venturi type, so designed as to be actuated by an increase in the velocity of flow through the valve. Since this increase in velocity is proportional to the amount of fluid and therefore the pressure of fluid applied on the inlet side of the valve, the valve is responsive to changes in flow volume and consequently to changes in flow demand made upon the filter assembly of the invention. This valve is placed in the line of flow between the inlet to the filter assembly, and the primary filter element. Preferably, the valve is placed in an inlet passage.

Pressure indicators can be provided, indicating the reaching of a predetermined pressure differential across the primary filter element, and across the secondary filter element, so that an indication is given to the operator that the primary or secondary filter element or both have become clogged, and require servicing.

Such valves rarely seal off bypass flow when the valve is closed; because of their flow responsive characteristic, there is a leakage bypass flow at all times that is especially high when the fluid flow approaches the crack-open point. Since leakage flow cannot usually be permitted to exceed a certain level, it becomes necessary to monitor leakage flow, and signal when it reaches the maximum level that can be tolerated.

The usual pressure indicators are not suitable, because they cannot distinguish between the pressure differentials across the valve arising from different levels of leakage flow, and pressure differentials arising from a higher flow rate across the orifice or venturi of the flow control valve. When a higher flow rate is required, a sudden flow surge results which may lead to actuation of the pressure indicator designed to indicate abnormal leakage flow. Pressure indicators therefore can give false indication of the monitored condition during periods of peak flow demand.

U.S. Pat. No. 3,335,863 patented Aug. 15, 1967, to Bernard F. Silverwater provides a differential pressure indicator that is less sensitive or even insensitive to flow surges, and yet detects any changes in static pressure due to a change in resistance across a filter element due to dirt loading, at or below the normal flow demand of the system. A changed or controlled response to flow surges is obtained by combining the indicator with a response control or converting means adapted to interchange velocity head and static head, and thus alter the static pressure component by an amount proportionate to the change in the velocity head component of the flow surge. One of the fluid lines leading from the pressure indicator is connected with the response control means by tapping the zone thereof of greatest changed static head in a manner to respond only to the changed static pressure component. Such response can be obtained by any of several techniques, including design of the response control means, and the design of the fluid circuit between the response control means and the pressure indicator. A valve can be combined with the response control means to isolate the pressure indicator from the fluid system thus rendering the indicator insensitive to flow surges.

The Silverwater device is effective but only over a small flow range; otherwise, the pressure losses become excessive. It is effective when used to measure viscous pressure drops such as across filter elements and to negate the effects of high flows of short duration through a partially blocked filter element. This eliminates premature element replacement.

In accordance with the invention, a flow sensor is provided responsive to fluid leakage flows within a range from above a predetermined minimum to below a predetermined maximum to indicate that flow is within that range and/or that the maximum leakage flow has been exceeded, but nonresponsive to fluid flows below the predetermined minimum or above the predetermined maximum, to avoid giving a false indication of fluid leakage flow, comprising, in combination:

(1) a housing having an inlet and an outlet and a through flow fluid passage therebetween;

(2) a flow responsive valve disposed across the fluid passage in a manner to control flow therethrough comprising (a) a valve seat;

(b) a valve member movable towards and away from the valve seat and having opposed faces receiving fluid pressure upstream and downstream, respectively, of the valve member;

(c) bias means biasing the valve member into a normally closed position against the valve seat with a force resisting upstream fluid pressure against the valve face tending to open the valve up to a predetermined minimum;

(d) a flow controlling orifice, preferably through but also optionally bypassing the valve member and open to flow past the valve member between the housing inlet and outlet at all times;

(e) at least one fluid flow passage downstream of the valve seat for flow past the valve member that is closed when the valve member is against the valve seat and open when the valve member is moved away from the valve seat; and (f) a leakage flow passage receiving leakage flow past the valve seat and carrying such flow past the valve member into the fluid flow passage, the valve member when in the closed position separating the leakage flow passage from the fluid flow passage, and when in the open position combining the leakage flow passage with the fluid flow passage;

(3) a differential pressure indicator having:

(a) cooperating actuating and indicating magnetic elements, the actuating element being movable between a first position in which it retains the indicating element in a nonindicating position and a second position in which the indicating element can move into an indicating position; the actuating element having opposed pressures faces and being movable towards one of the two positions according to the pressure differential therebetween;

(b) a first fluid passage communicating fluid pressure in the fluid leakage flow passage after the valve member to the first pressure face and a second fluid passage communicating fluid pressure at the flow-controlling orifice of the valve member to the second pressure face;

(c) bias means retaining the actuating element in a first position to retain the indicating element in a nonindicating position at pressure differentials thereacross up to a predetermined minimum; and at pressure differentials exceeding the minimum to move away from the indicating element and release it to signal the reaching of such minimum pressure differential;

(4) the valve member when moved away from the valve seat combining the fluid leakage flow and fluid flow passages and thereby reducing the measured pressure differential between the first and second fluid passages to below said predetermined minimum, thereby preventing actuation of the differential pressure indicator while the valve member remains in the open position.

In a preferred embodiment, the flow responsive valve has a valve member such as a poppet biased against a valve seat, and the poppet has an orifice or throat such as a venturi considerably reducing the diameter of the passage available for flow, such as in the inlet passage, and as a consequence of this reduction in diameter, the velocity of flow through the valve poppet orifice increases.

However, it is also possible to provide an orifice, venturi or narrow passage by-passing the valve member, such as a poppet, in the housing beside the valve member, and in parallel thereto, linking the upstream and downstream fluid flow passages on each side of the valve member. Such a flow passage can provide the necessary pressure drop and cause the valve member to open at a predetermined pressure drop due to flow.

The total pressure in the fluid remains constant, and is the sum of the static pressure and the velocity pressure. Hence, an increase in the velocity pressure at any point will result in a decrease in the static pressure at that point. Under normal flow conditions, a steady state exists in which the force due to the high static pressure on the inlet side of the valve member, such as a poppet, is less than the total force holding the valve member in place, and the valve member remains stationary. However, when the flow volume and hence rate increases, the velocity of flow through the orifice increases, and results in a reduction in static pressure at the orifice, which reduces the force tending to hold the valve member stationary against the inlet flow. The valve member is designed to be actuated whenever the reduction in static pressure across the orifice falls below a predetermined minimum.

The valve is so positioned in the fluid line, such as the inlet passage, as under normal flow conditions to close off the line to all flow except that accommodated by the orifice or venturi. The result is that all flow must pass through the orifice or venturi of the valve member. At a predetermined pressure differential in static pressure between the valve face or inlet side of the valve and the other side of the valve, the minimum value of which is determined by the flow requirements of the system, the valve is actuated in a manner to fully open the passage between the inlet and outlet.

The amount of opening can be designed to be proportional to the magnitude of the pressure differential, and thus the amount of bypass flow can be made directly dependent upon the rate of flow. While the valve is open, flow continues, but flow through the orifice after cracking is dependent on the design of the valve member. For example, if the loaded valve member exposes a larger upstream pressure area after cracking, the differential pressure across the valve will be reduced, and hence there will then be less flow through the orifice. In any case, at all positions of the valve member, flow is supplied to and through the fluid passage.

A preferred embodiment of the flow responsive valve comprises structurally a poppet reciprocatingly mounted in the passage and spring-biased against a valve seat in a position to partially close off the flow passage, and a constricted flow passage through the poppet in the form of an orifice or venturi connecting the inlet with the outlet in all positions of the valve. The pressure exerted by the compression spring against the poppet can be adjusted as required, and the dimensioning of the orifice or venturi is matched with the compressive force of the spring, and the dimensioning of the pressure chamber and surface area of the poppet exposed therein to fluid pressure, so as to obtain actuation of the valve poppet at the predetermined pressure differential (due to flow) in static pressure across the orifice.

While spring biasing means is preferred, magnetic, electrostatic or electromagnetic biasing means can also be used. In the case of magnetic or electrostatic means, twin magnets can be used, at each extremity of reciprocation of the poppet, and the poppet itself can be magnetic, oriented so as to be attracted to the magnet holding the poppet in the closed position and repelled by the magnet holding the poppet in the open position, and both magnets are so placed that the poppet at each extremity is within the field of both magnets. Thus reseating of the poppet in the closed position is ensured when the flow is returned to normal. In the case of electromagnetic biasing means, the coil windings can be varied to provide the required biasing forces.

In another embodiment, the valve poppet can also be to be actuated by a fluid pressure against the inlet face of the orifice, whenever the pressure drop across a filter reaches a predetermined maximum. This is done by shaping the inlet face of the valve poppet to a larger surface area than the combined surface area in the pressure chamber and facing the passage on the outlet side of the poppet. Thus, whenever the fluid pressure on the inlet face exceeds the pressure in the passage closed off by the poppet by a predetermined amount, the valve poppet is actuated, just as in the case of a predetermined excessive static pressure differential. In this embodiment the differential pressure indicator pressure taps will be placed so as to only measure the pressures due to flow and be insensitive to differential pressures due to the contaminated element.

Thus, the valve can be designed to actuate, in the preferred embodiment, whenever the fluid flow through the passage exceeds a predetermined minimum, so that the total pressure differential between the inlet passage and the outlet passage across the poppet exceeds a predetermined minimum. Thereupon the valve poppet is actuated.

The leakage flow passage extends past the valve member, such as the valve poppet, from the valve seat to the fluid flow passage downstream of the valve seat. The passage can be through the valve member, or through the housing, but it is usually simpler to place the valve seat in a recess in the fluid flow passage into which the valve member fits against the seat with a small clearance at the sides thereof, defining the leakage flow passage. Then, when the valve member moves out of the recess into the open position, the barrier is withdrawn, resulting in the combination of the recess with the fluid flow passage.

Those skilled in the art are aware of the parameters to be taken into account in determining the diameters of orifices or venturi passages. The exact dimensions for the valve member faces and passages must be determined for each particular system, but this is readily accomplished by standard design and calculation.

The flow valve can be constructed of any durable material inert to the fluid being circulated through the system. Metal valves, such as those made of aluminum, stainless steel, and other stainless alloys, are preferred, but it is also possible to fabricate the valve from synthetic polymers and cellulose derivatives, such as polytetrafluoroethylene, polypropylene, polyethylene, polystyrene, nylon, polyoxymethylene, acrylonitrile rubbers and fluorocarbon rubbers.

In accordance with the invention a differential pressure indicator is combined with the flow responsive valve in a manner so as to sense differential fluid pressure between the leakage flow passage or total pressure upstream of the valve member, and the fluid flow passage downstream of the valve seat when the valve member is in the closed position, but not when the valve member is in the open position. For this purpose, the high pressure tap of the differential pressure indicator senses the fluid pressure upstream of the valve member, which is equal to the total pressure in the orifice as measured on the downstream side. The low pressure tap senses the pressure on the downstream side of the valve member seat when the valve is closed. Then the valve cracks, the valve member just moves off the seat, and the downstream tap senses the higher total pressure upstream of the valve (minus some velocity head losses). The differential pressure from crack open to full open is less than the preset indicating pressure, and hence the indicator will not actuate. In order to prevent false actuation in the interval of time to go from leakage flow to operational flow, the differential pressure indicator must have a time delay mechanism. This is provided by orifice 42b in passage 42 of the device shown in FIGS. 1 and 2, and orifice 73 in passage 72 of the device shown in FIG. 3.

The differential pressure indicator comprises, in its broadest aspect, a housing, a first fluid passage in the housing communicating with fluid pressure in the leakage flow passage below the valve seat; a second fluid passage in the housing communicating with the flow-controlling orifice at or below the valve seat; an indicating magnetic element in the housing for movement into and from an indicating position; and an actuating magnetic member controlling movement of the indicating element in response to changes in pressure between the two fluid passages.

The indicating and actuating magnetic means can be any of those well-known in the indicator art. The preferred form is the magnetic form disclosed in U.S. Pat. No. 2,942,572, dated June 28, 1960, to David B. Pall. This device comprises a piston means movably mounted in the housing, first magnetic means movable with the piston means toward and away from a first position, bias means urging the piston means in one direction and normally retaining the first magnetic means in the first position, fluid duct means communicating with a source of fluid under pressure and with one end of the piston means to urge it in the opposite direction, second magnetic means movable toward and away from the first magnetic means and normally retained toward the first magnetic means by magnetic attraction when the first magnetic means is in the first position, and bias means urging the second magnetic means away from the first magnetic means selected to overcome the force of magnetic attraction when the first magnetic means is more than a predetermined distance away from the second magnetic means.

Also useful are the diaphragm type devices described in U.S. Pat. No. 3,077,176 to D. B. Pall et al., dated Feb. 12, 1963. These devices include a flexible magnetic diaphragm assembly movably mounted in the housing, toward and away from a first position, bias means urging the diaphragm assembly in one direction and normally retaining the same in the first position, fluid duct means communicating with a source of fluid under pressure and with one face of the diaphragm assembly to urge it in the opposite direction, magnetic means movable toward and away from the magnetic diaphragm assembly and normally retained toward the assembly by magnetic attraction when the assembly is in the first position, and bias means urging the magnetic means away from the assembly selected to overcome the force of the magnetic means when the assembly means is more than a predetermined distance away therefrom.

U.S. Pat. No. 3,140,690 patented July 14, 1964 provides a device having a first magnetic means arranged to attract a second magnetic means so long as the two means are separated by less than a predetermined distance, and bias means to propel the second magnetic element to an indicating position whenever that distance is exceeded. Retention of the second element in either the attracted or the indicating position, or both, is ensured by a third magnetic means so arranged so as to attract the second magnetic means so long as it is in the first position, and/or to attract the second magnetic means so long as it is in the indicating position. This type of device can also be used.

Figure 1:
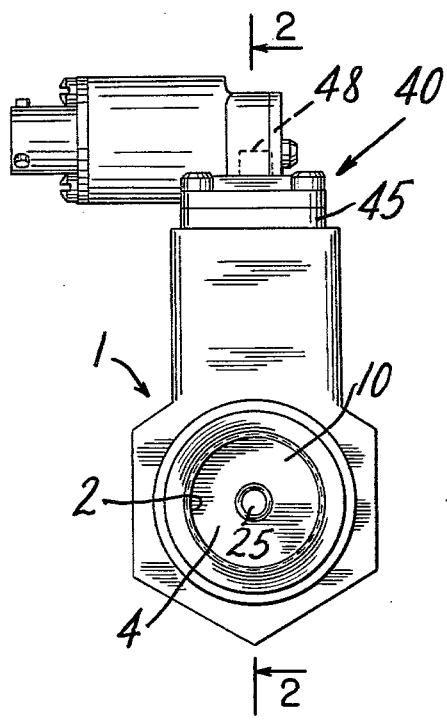
FIG. 1 represents a top view of the flow sensor and maximum leakage flow indicator in accordance with the invention.
Figure 2:
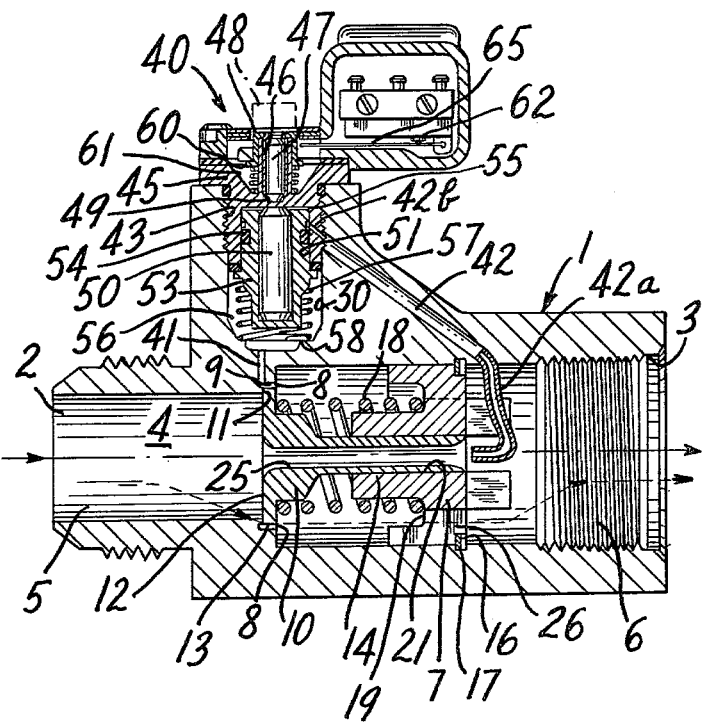
FIG. 2 represents a longitudinal section taken along the line 2—2 of FIG. 1, and looking in the direction of the arrows.

The flow sensor and maximum system leakage flow indicator shown in FIGS. 1 and 2 has a housing 1 with an inlet port 2 and an outlet port 3 connected by a fluid flow passage 4 for through fluid flow in for example an aircraft hydraulic line feeding the landing gear and hydraulic controls system.

Disposed across the line of flow through the fluid flow passage 4 is a hollow flow-responsive bypass poppet valve 10, spring-biased into a normal position shown in FIG. 2 in which it is seated against a valve seat 11, at the stepped junction between the bores 3 and 4. The valve poppet 10 is tubular, with flat end walls 12 and cylindrical side walls 13,14. The walls 14 fit snugly against the walls of the bore 21 in a sliding fit, so that the valve 10 can move reciprocably towards and away from the valve seat 11 in the bore. The walls 13 fit in the recess 9 with a small clearance of approximately 0.1 to 3 mm defining a fluid leakage flow passage 8 extending from the valve seat 11 to passage 4 downstream of the valve 10 and valve seat 11.

The lock ring 16, which fits in the groove 17 of the bore 6, holds the valve guide 7 fixedly in position. The valve guide 7 retains one end of a compression spring 18 nested in the annular recess 19, the other end of which is seated against the downstream face of the valve poppet 10. The spring 18 accordingly biases the valve poppet 10 against the valve seat 11.

The valve guide 7 has an open central bore 21 receiving in a loose sliding fit with a small clearance the central hub 14 of the poppet valve 10. Thus, the bore 21 acts as a guide or track for reciprocable movement of the valve poppet 10 into engagement with and away from engagement with the valve seat 11 in the recess, and the spring 18 helps to retain the poppet in alignment for easy sliding movement. Upon application of a sufficient fluid pressure differential across the valve poppet 10, overcoming the biasing force of the spring 18, the valve will move away from the valve seat, and sliding in the bore 21 of guide 7, and thereby connects the two bores 5 and 6 with passage 4.

The valve poppet 10 has an open central passage 25 also communicating bores 5 and 6, and this permits normal flow in the fluid line to pass from the inlet 2 to the outlet 3 at all times. This flow may for example be of the order of 3±0.5 gpm at 100° F. of MIL-H-5606 fluid at a pressure differential of approximately 7 psi across the valve poppet, without the valve poppet moving away from the valve seat 11.

If however the flow in the fluid line at the inlet exceeds 3±0.5 gpm, the biasing force of the spring 18 will be exceeded, and the valve poppet 10 will be forced away from its valve seat 11, opening the bypass line to accommodate this additional flow. Thus, the bypass line will be open at all flows in excess of 3±0.5 gpm, up to a maximum flow of approximately 29 gallons per minute, at a differential pressure across the valve of 25 psi.

The valve housing 1 also includes a side bore 30 at right angles to the fluid flow passage, serving as a socket in which is placed the maximum system leakage flow indicator 40 in accordance with the invention.

There are two fluid flow connections between the socket 30 and the fluid line 4, one passage 41 entering the fluid leakage flow passage 8 just below the valve seat 11 in the side wall of the recess 9, and the other passage 42 entering the downstream end of passage 25 of the valve poppet 10 via a bent tube 42a.

There is a small orifice 42b in the passage 42 which restricts fluid pressure communication and thus provides a time delay.

The differential pressure indicator in the socket 30 is composed of an indicator housing 45, which is mounted by external screws (not shown) which screw into the internally threaded holes 43 circumferentially located around the socket 30. In a blind bore 46 of housing 45 is an indicating magnetic element 47, which is movable reciprocably between indicating and nonindicating positions. The portion 48 of the indicating element is colored red, and projects from the housing 45 when the element is actuated. The normal position is however within the housing 45, as shown in FIG. 2, with the inner end of the element 47 abutting the base wall 49 of the blind bore.

The indicating element is held in this position by magnetic attraction to the actuating magnetic element 50, one end of which, having a polarity opposite to the polarity of the indicating element 47, is abutting the other side of the wall 41 of the blind bore. This element is disposed in a socket 51 of the indicator housing 45, retained within a cylindrical sleeve 53, which is movable towards and away from the wall 49, and is provided with an O-ring 54 for leak-tight sealing against the walls of the socket 51, thus separating the socket into two chambers 55, 56. It will be noted that the passage 41 is in fluid flow connection with the portion 56 of the chamber, while the passage 42 is in fluid flow connection with the portion 55 of the chamber, the O-ring seal 54 preventing fluid communication therebetween, with the result that the chamber 56 sees fluid pressure at the leakage flow passage 8, while chamber 55 sees fluid pressure in the passage 25 of the poppet 10.

The actuating element 50 is held against the wall 49 by the compression spring 57, one end of which is seated against the base 58 of the socket, while the other end is seated against a flange on the sleeve 53 and thus tends to retain the actuating element in the position shown in FIG. 2.

The indicating element 47 is provided with a flange 60, and a compression spring 61 is retained between the inner face of this flange and the base 49 of the blind bore. This spring tends to drive the indicating element 47 into the indicating position, with the red button extended from the indicator housing, but the indicating element 47 is normally held against the biasing force of the spring by the force of magnetic attraction between it and the actuating element 50. While the actuating element 50 is against the wall 49 in the position shown in FIG. 2 this force of attraction is sufficient to hold the indicating element in the nonindicating position.

If however the fluid pressure in passage 25 (and thus in chamber 55 via passage 42) increases to a level at which it exceeds the biasing force of the spring 57, it drives the actuating element 50 away from the wall 49. As soon as that element has reached a distance at which the force of magnetic attraction between the actuating element 50 and the indicating element 47 is insufficient to overcome the biasing force of the spring 61, the indicating element 47 pops out of the housing.

Under normal conditions, there is small leakage flow past the valve poppet 10 from the seat 11 into the recess, and this small flow proceeds via leakage flow passage 8 into passage 26 and then through passage 6. Such flow is at a reduced fluid pressure as compared to inlet pressure. While the valve poppet 10 is against the valve seat 11, pressure in poppet passage 25 is communicated to the actuating element 50 via passage 42, and through the restrictive orifice 42b, and when it exceeds a predetermined minimum the actuating element 50 moves away from the wall 49, and the indicating element then is driven to the indicating position by the spring 61. However, such actuation can only occur while the valve poppet is in the seated position, shown in FIG. 2. If the valve poppet is forced away from its seat and away from the recess the passage 41 communicates a higher fluid pressure which is the static pressure plus the velocity head with the result that the element 50 sees a higher fluid pressure in chamber 56, and does not move. Thus, when the valve poppet is away from its seat, it is impossible to actuate the indicator, since then the pressure differential between the passages 41, 42 and chambers 55, 56 is insufficient to overcome the force of the biasing spring 57.

Accordingly, the pressure indicator senses only flow in relation to leakage flow, and is therefore a maximum system leakage flow indicator.

If desired, the indicating element can also be made to actuate a switch, as well as giving a visual signal. Switch actuation is provided for in FIG. 2 by the flange 60 on the side of the indicating element 47. When the indicating element 47 moves into the actuated position, with the red button extending from the housing, the flange 60 contacts and moves the lever 65, driving it against the contact 62, and thus closing the circuit, and actuating the switch, giving an electric signal, or moving a solenoid valve, or ringing a bell, for example, as desired.

In the embodiment of flow sensor and maximum leakage flow indicator of FIG. 3, the upstream pressure is tapped before the flow orifice through the valve instead of below the flow orifice. In other respects, the device is similar to that of FIGS. 1 and 2, and consequently like reference numerals are used for like parts.

Figure 3:
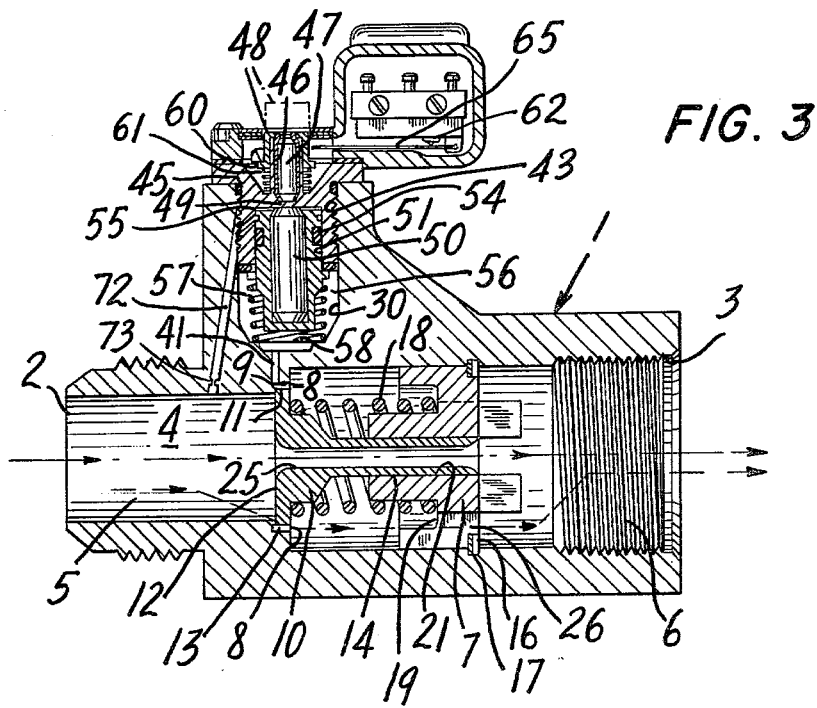
FIG. 3 represents a longitudinal section through another embodiment of flow sensor and maximum leakage flow indicator, in which the upstream pressure is tapped before the flow orifice through the valve instead of after the flow orifice.

The flow sensor and maximum system leakage flow indicator shown in FIG. 3 has a housing 1 with an inlet port 2 and an outlet port 3 connected by a fluid flow passage 4 for through fluid flow in for example an aircraft hydraulic line feeding the landing gear and hydraulic controls system.

Disposed across the line of flow through the fluid flow passage 4 is a hollow flow-responsive bypass poppet valve 10, spring-biased into the normal position shown in FIG. 3 in which it is seated against a valve seat 11, at the stepped junction between the bores 3 and 4. The valve poppet 10 is tubular, with flat end walls 12 and cylindrical side walls 13, 14. The walls 14 fit snugly against the walls of the bore 21 in a sliding fit, so that the valve 10 can move reciprocably towards and away from the valve seat 11 in the bore. The walls 13 fit in the recess 9 with a small clearance of approximately 0.1 to 3 mm defining a fluid leakage flow passage 8 extending from the valve seat 11 to passage 4 downstream of the valve 10 and valve seat 11.

The lock ring 16, which fits in the groove 17 of the bore 6, holds the valve guide 7 fixedly in position. The valve guide 7 retains one end of a compression spring 18 nested in the annular recess 19, the other end of which is seated against the downstream face of the valve poppet 10. The spring 18 accordingly biases the valve poppet 10 against the valve seat 11.

The valve guide 7 has an open central bore 21 receiving in a loose sliding fit with a small clearance the central hub 14 of the poppet valve 10. Thus, the bore 21 acts as a guide or track for reciprocable movement of the valve poppet 10 into engagement with and away from engagement with the valve seat 11 in the recess, and the spring 18 helps to retain the poppet in alignment for easy sliding movement. Upon application of a sufficient fluid pressure differential across the valve poppet 10, overcoming the biasing force of the spring 18, the valve will move away from the valve seat, and sliding in the bore 21 of guide 7, and thereby connects the two bores 5 and 6 with passage 4.

The valve poppet 10 has an open central passage 25 also communicating bores 5 and 6, and this permits normal flow in the fluid line to pass from the inlet 2 to the outlet 3 at all times. This flow may for example be of the order of 3±0.5 gpm at 100° F. of MIL-H-5606 fluid at a pressure differential at approximately 7 psi across the valve poppet, without the valve poppet moving away from the valve seat 11.

If however the flow in the fluid line at the inlet exceeds 3±0.5 gpm, the biasing force of the spring 18 will be exceeded, and the valve poppet 10 will be forced away from its valve seat 11, opening the bypass line to accommodate this additional flow. Thus, the bypass line will be open at all flows in excess of 3±0.5 gpm, up to a maximum flow of approximately 29 gallons per minute, at a differential pressure across the valve of 25 psi.

The valve housing 1 also includes a side bore 30 at right angles to the fluid passage, serving as a socket in which is placed the maximum system leakage flow indicator 40 in accordance with the invention. There are two fluid flow connections between the socket 30 and the fluid line 4, one passage 41 entering the fluid leakage flow passage 8 just below the valve seat 11 in the side wall of the recess 9, and the other passage 72 entering the bore 5 just above the upstream end of passage 25 of the valve poppet 10. There is a small orifice 73 in the passage 72 which restricts fluid pressure communication and thus provides a time delay.

The differential pressure indicator in the socket 30 is composed of an indicator housing 45, which is mounted by external screws (not shown) which screw into the internally threaded holes 43 circumferentially located around the socket 30. In a blind bore 46 of housing 45 is an indicating magnetic element 47, which is movable reciprocably between indicating and nonindicating positions. The portion 48 of the indicating element is colored red, and projects from the housing 45 when the element is actuated. The normal position is however within the housing 45, as shown in FIG. 2, with the inner end of the element 47 abutting the base wall 49 of the blind bore.

The indicating element is held in this position by magnetic attraction to the actuating magnetic element 50, one end of which having a polarity opposite to the polarity of the indicating element 47 is abutting the other side of the wall 49 of the blind bore. This element is disposed in a socket 51 of the indicator housing 45, retained within a cylindrical sleeve 53, which is movable toward and away from the wall 49, and is provided with an O-ring 54 for leak-tight sealing against the walls of the socket 51, thus separating the socket into two chambers 55, 56. It will be noted that passage 41 is in fluid flow connection with the portion 56 of the chamber, while the passage 72 is in fluid flow connection with the portion 55 of the chamber, the O-ring seal 54 preventing fluid communication therebetween, with the result that the chamber 56 sees fluid pressure at the leakage flow passage 8, while chamber 55 sees upstream fluid pressure in the bore 5 before passage 25 of the poppet 10.

The actuating element 50 is held against the wall 49 by the compression spring 57, one end of which is seated against the base 58 of the socket, while the other end is seated against a flange on the sleeve 53 and thus tends to retain the actuating element in the position shown in FIG. 3.

The indicating element 47 is provided with a flange 60, and a compression spring 61 is retained between the inner face of this flange and the base 49 of the blind bore. This spring tends to drive the indicating element 47 into the indicating position, with the red button extending from the indicator housing, but the indicating element 47 is normally held against the biasing force of the spring by the force of magnetic attraction between it and the actuating element 50. While the actuating element 50 is against the wall 49 in the position shown in FIG. 3 this force of attraction is sufficient to hold the indicating element in the nonindicating position.

If however the upstream fluid pressure in bore 5 before passage 25 (and thus in chamber 55 via passage 72) increases to a level at which it exceeds the biasing force of the spring 57, it drives the actuating element 50 away from the wall 49. As soon as that element has reached a distance at which the force of magnetic attraction between the actuating element 50 and the indicating element 47 is insufficient to overcome the biasing force of the spring 61, the indicating element 47 pops out of the housing.

Under normal conditions, there is small leakage flow past the valve poppet 10 from the seat 11 into the recess, and this small flow proceeds via leakage flow passage 8 into passage 26 and then through passage 6. Such flow is at a reduced fluid pressure as compared to inlet pressure. While the valve poppet 10 is against the valve seat 11, upstream pressure in bore 5 is communicated to the actuating element 50 via passage 72, and through the restrictive orifice 73, and when it exceeds a predetermined minimum the actuating element 50 moves away from the wall 49, and the indicating element then is driven to the indicating position by the spring 61. However, such actuation can only occur while the valve poppet is in the seated position, shown in FIG. 3. If the valve poppet is forced away from its seat and away from the recess the passage 41 communicates a fluid pressure which is the total of the static pressure plus the velocity head with the result that the element 50 sees a fluid pressure in chamber 56 that is not sufficiently lower than the fluid pressure in chamber 55, and therefore does not move. Thus, when the valve poppet is away from its seat, it is impossible to actuate the indicator, since then the pressure differential between the passages 41,72 and chambers 55, 56 is insufficient.

Accordingly, the pressure indicator senses only flow in relation to leakage flow, and is therefore a maximum system leakage flow indicator.

If desired, the indicating element can also be made to actuate a switch, as well as giving a visual signal. Switch actuation is provided for in FIG. 3 by the flange 60 on the side of the indicating element 47. When the indicating element 47 moves into the actuated position, with the red button extending from the housing, the flange 60 contacts and moves the lever 65, driving it against the contact 62, and thus closing the circuit, and actuating the switch, giving an electric signal, or moving a solenoid valve, or ringing a bell, for example as desired.

Having regard to the foregoing disclosure, the following is claimed as the inventive and patentable embodiments thereof:

1. A flow sensor responsive to fluid leakage flows within a range from above a predetermined minimum to below a predetermined maximum to indicate that flow is within that range and/or that the maximum leakage flow has been exceeded, but nonresponsive to fluid flows below the predetermined minimum or above the predetermined maximum, to avoid giving a false indication of fluid leakage flow, comprising in combination:
(1) a housing having an inlet and an outlet and a through flow fluid passage therebetween;
(2) a flow responsive valve disposed across the fluid passage in a manner to direct flow therethrough comprising:
  (a) a valve seat;
  (b) a valve member movable towards and away from the valve seat and having opposed faces said member individing means for receiving downstream fluid pressure on a downstream face;
  (c) bias means biasing the valve member into a normally closed position against the valve seat with a force resisting upstream fluid pressure against an upstream valve face tending to bias the valve downstream;
  (d) said means for receiving downstream fluid pressure including a flow controlling orifice open to flow past the valve member between the housing inlet and outlet at all times;
  (e) a first fluid flow passage downstream of the valve seat and in communication with leakage flow past the seat when the valve member is against the valve seat;
  (f) said leakage flow passage receiving leakage flow past the valve seat and carrying such flow past the valve member into the first fluid flow passage;
(3) a differential pressure indicator having;
  (a) cooperating actuating and indicating magnetic elements, the actuating element being movable between a first position in which it retains the indicating element in a nonindicating position and a second position in which the indicating element can move into an indicating position; the actuating element having opposed pressure faces and being movable towards one of the two positions according to the pressure differential therebetween;
  (b) said first fluid passage communicating fluid pressure to one of the actuating element pressure faces and a second fluid passage communicating fluid pressure downstream at the flow-controlling orifice through said means for receiving downstream pressure to the other pressure face;
  (c) bias means retaining the actuating element in a first position to retain the indicating element in a nonindicating position at pressure differentials thereacross up to a predetermined minimum; and at pressure differentials exceeding the minimum to move away from the indicating element and release it to signal the reaching of such minimum pressure differentials.

2. A flow sensor responsive to fluid leakage flows within a range from above a predetermined minimum to below a predetermined maximum to indicate that flow is within that range and/or that the maximum leakage flow has been exceeded but nonresponsive to fluid flows below the predetermined minimum or above the predetermined maximum, to avoid giving a false indication of fluid leakage flow, comprising in combination:
(1) a housing having an inlet and an outlet and a through flow lfuid passage therebetween;
(2) a flow responsive valve dispoed across the fluid passage in a manner to direct flow therethrough comprising
  (a) a valve seat
  (b) a valve member movable towards and away from the valve seat and having opposed faces said member including means for receiving downstream fluid pressure on a downstream pressure face;
  (c) bias means biasing the valve member into a normally closed position against the valve seat with a force resisting upstream fluid pressure against an upstream valve face tending to bias the valve downstream;
  (d) said means for receiving downstream fluid pressure including a flow controlling orifice open to flow past the valve member between the housing inlet and outlet at all times;
  (e) a first one fluid flow passage downstream of the valve seat and in communication with leakage flow past the seat when the valve member is against the valve seat;
  (f) said leakage flow passage receiving flow past the valve seat and carrying such flow past the valve member into the first fluid flow passage;
(3) a differential pressure indicator having:
  (a) cooperating actuating and indicating magnetic elements, the actuating element being movable between a first position in which it retains the indicating element in a nonindicating position and a second position in which the indicating element can move into an indicating position; the actuating element having opposed pressure faces and being movable towards one of the two positions according to the pressure differential therebetween;
  (b) said first fluid passage communicating fluid pressure one of the actuating element pressure faces and a second fluid passage upstream of the valve member communicating fluid pressure to the second pressure face;
  (c) bias means retaining the actuating element in a first position to retain the indicating element in a nonindicating position at pressure differentials thereacross up to a predetermined minimum; and at pressure differentials exceeding the minimum to move away from the indicating element and release it to signal the reaching of such minimum pressure differentials.

3. A flow sensor according to claim 2 in which said second passage includes means for delaying communication of fluid pressure therethrough to delay actuation of said actuating element.

4. A flow sensor according to claim 1 or 2 in which the flow-controlling orifice is an orifice through the valve member.

5. A flow sensor according to claim 1 or 2, in which the valve member of the flow responsive valve is a poppet biased against the valve seat, and the flow controlling orifice is an orifice through the poppet.

6. A flow sensor according to claim 1 or 2 in which the valve member of the flow responsive valve is a poppet biased against the valve seat, and the flow controlling orifice is a narrow flow passage through the poppet.

7. A flow sensor according to claim 6 in which the narrow flow passage is a venturi.

8. A flow sensor according to claim 3, in which the delaying means in the second fluid passage is an orifice.

9. A flow sensor according to claim 1 or 2, including a switch operable by the indicating element upon movement to an indicating position.

10. A flow sensor according to claim 1 or 2, in which the actuating element is in the form of a piston, moving in a bore into which the first and second fluid passages open.

11. A flow sensor according to claim 1 or 2, in which the actuating element is a piston of high surface area.

12. A flow sensor according to claim 1 or 2, in which the bias means for the value member is a spring.

13. A flow sensor according to claim 1 or 2, in which the bias means for the actuating element is a magnet.

14. A flow sensor according to claim 1 or 2, in which the indicating element is arranged so as to become visible after actuation.

15. A flow sensor according to claim 1 or 2, in which both the actuating and indicating elements are magnets.

16. A flow sensor according to claim 1 or 2, in which one of the actuating and indicating elements is a magnet, and one is of magnetizable material.

17. A flow sensor according to claim 1 or 2, in which the actuating and indicating elements are mutually attracting.

18. A flow sensor according to claim 1 or 2, in which the actuating and indicating elements are mutually repelling.

19. A flow sensor according to claim 1 or 2, in which the actuating element is spaced from and arranged to attract the indicating element and the bias means is arranged to retain the actuating element in a position toward the indicating element.

20. A flow sensor according to claim 1 or 2, in which the actuating element is spaced from and arranged to repel the indicating element and the bias means is arranged to retain the actuating element in a first position away from the indicating element.

* * * * *

UNITED STATES PATENT AND TRADEMARK OFFICE
CERTIFICATE OF CORRECTION

PATENT NO. : 4,205,702
DATED : June 3, 1980
INVENTOR(S) : Bernard F. Silverwater It is certified that error appears in the above-identified patent and that said Letters Patent are hereby corrected as shown below:

[54] In the second line of the title "FLOW" should be --FLOWS--.
Column 1, line 2 : "FLOW" should be --FLOWS--.
Column 4, line 22 : "pressures" should be --pressure--.
Column 5, line 63 : Insert "designed" at the end of the line.
Column 11, line 34: after "fluid" insert --flow--.
Column 13, line 26: "individing" should be --including--.
Column 14, line 10: "lfuid" should be --fluid--.
Column 14, line 11: "dispoed" should be --disposed--.
Column 15, line 23: "value" should be --valve--.

Signed and Sealed this

Fourth Day of November 1980

[SEAL]

Attest:

SIDNEY A. DIAMOND

Attesting Officer

Commissioner of Patents and Trademarks